March 20, 1956     C. R. HAGEN     2,739,015
PNEUMATIC CONVEYOR STRUCTURE
Filed Oct. 28, 1954
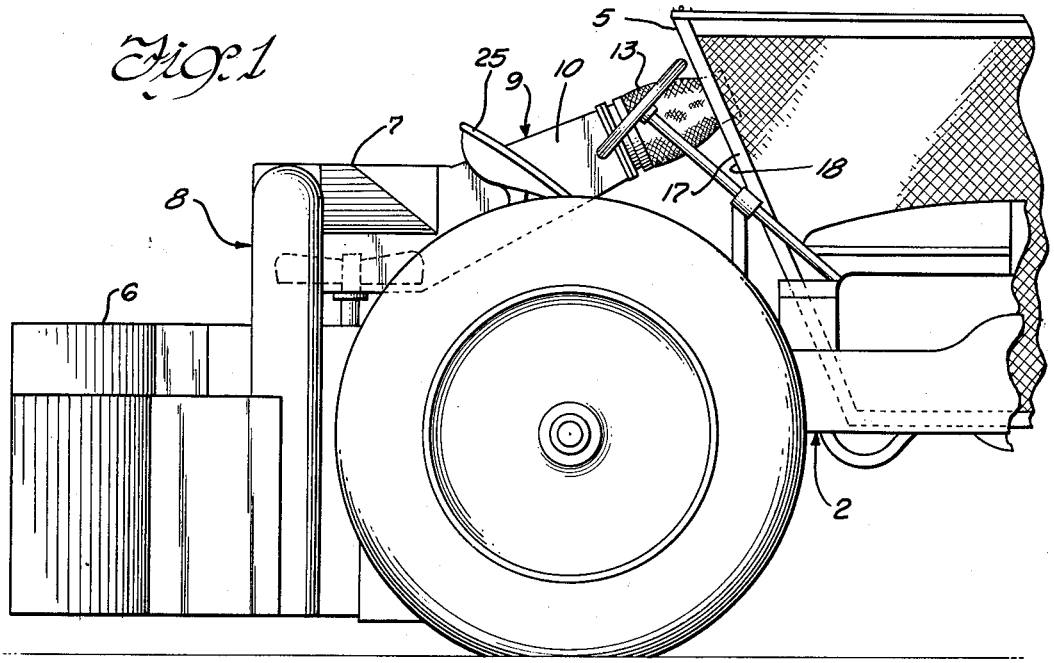
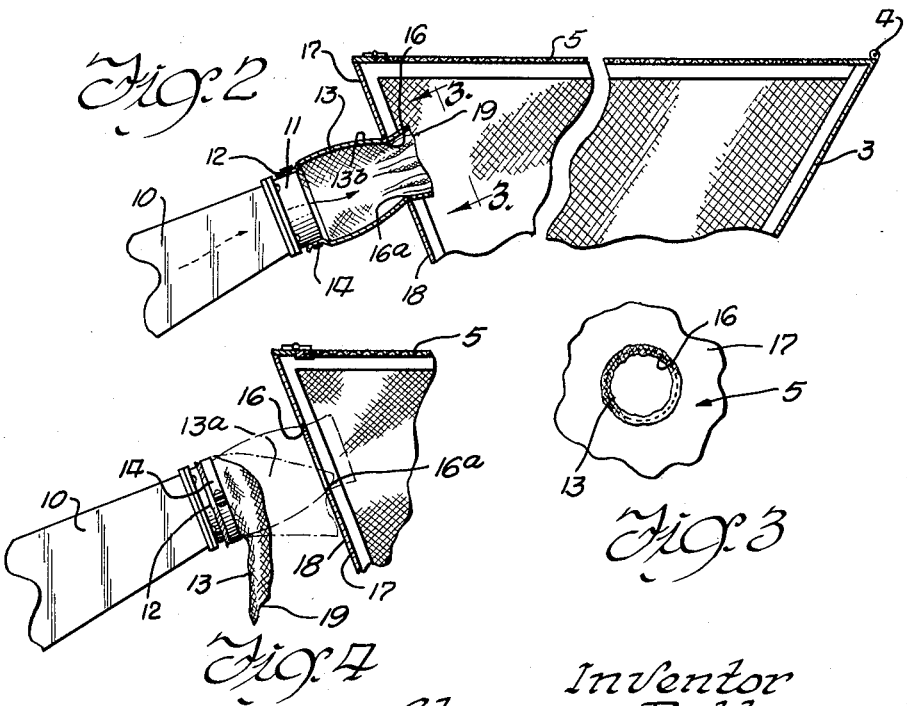
Inventor
Clarence R. Hagen
Paul O. Pippel
Attorney

United States Patent Office 2,739,015
Patented Mar. 20, 1956

2,739,015

PNEUMATIC CONVEYOR STRUCTURE

Clarence R. Hagen, Memphis, Tenn., assignor to International Harvester Company, a corporation of New Jersey Application October 28, 1954, Serial No. 465,250

8 Claims. (Cl. 302—59)

This invention relates to pneumatic conveyors and more particularly to a novel arrangement for sealing a conveyor duct to the inlet of a receptacle to prevent blow-back of material from the receptacle.

The invention as shown in association with a cotton harvester of the type shown in my co-pending U. S. application Serial No. 459,475, filed September 30, 1954, for Cotton Harvester, wherein the basket or cotton receptacle is swingable from a receiving position to a dumping position, the receptacle in the receiving position adapted to receive cotton from the harvester which is picking the crop in the field and in the dumping position being displaced in order to dump the cotton into a wagon or the like. In such apparatus, this being only one to which the invention is applicable, difficulty is encountered in retaining the cotton which is light and fluffy within the basket when the same is almost full inasmuch as the blast of air is redirected by the accumulated cotton and passes out between the conveyor duct and the inlet opening of the receptacle which heretofore has been made extremely lose and poor fitting in order to accommodate relative movement between the basket and the conveyor pipe.

A general object of the invention is to provide a flexible pipe or tube section on the end of the rigid conduit or duct of the pneumatic conveyor and this tube being constructed of flexible deformable material such as cotton, cloth or canvas so that upon the introduction of air into the conveyor pipe, this flexible tube extends outwardly from the rigid pipe section and spans the gap between the same and the basket and enters into the basket, the said flexible tube or extension adapted to withdraw from the receptacle and to deflate when the air blast in the conveyor pipe is cut-off so as to readily accommodate dumping of the receptacle.

A still further object of the invention is to dispose the receptacle opening and the rigid portion of the conveyor duct and the flexible tube sections so that the said tube section will be readily guided into the opening from its collapsed condition as it is being extended and expanded so that it will automatically enter into the opening.

A still further object of the invention is to provide such a flexible and expansible tube portion which will inflate and is dimensioned slightly larger than the inlet opening of the receptacle so as to provide a seal between the conveyor duct and the receptacle and thereby prevent blow-back of the material from the receptacle as the receptacle is almost full.

These and other objects of the invention will be more apparent from the specification and the drawings wherein:

Figure 1 is a fragmentary side elevation of a cotton harvester showing the invention applied to the pneumatic conveyor system thereof;

Figure 2 is a fragmentary transverse vertical sectional view of the receptacle and the flexible tube;

Figure 3 is a fragmentary view taken substantially on the line 3—3 of Figure 2; and Figure 4 illustrates the structure shown in Figure 2 but showing the tube section in deflated position in solid lines and in dotted lines in the position it assumes as it is being inflated.

Describing the invention in detail, the support structure herein comprising the tractor 2 and the framework 3 carried thereby pivotally supports as at 4 the cotton receptacle or basket 5 for swinging movement about a substantially horizontal axis to a dumping position or to a receiving position such as shown in Figures 1, 2 and 4. The support structure 2 also carries a cotton harvester 6 which may be of the type shown in U. S. Patent 2,140,-631, and the harvester incorporates a fan or blower 7 which is part of the pneumatic conveying system generally designated 8, as shown in Figure 1. The pneumatic system 8 incorporates a diagonally upwardly and outwardly directed duct generally indicated 9, which includes a rigid pipe section 10 which is fixedly positioned at the inclination of the duct 9 and the outer discharge end 11 of the rigid pipe section 10 is connected to the inner end 12 of a flexible tube or pipe 13 which may be formed of cotton material or canvas or any other collapsible material. The connection between the portions 11 and 12 may be in the form of a band 14 embracing the same.

It will be noted that in the receiving position of the basket, the duct 9 as well as the rigid pipe portion 10 are disposed in longitudinal alignment with the receiving or inlet opening 16 formed in a side 17 of the receptacle, and the side 17 is herein shown as a panel which slopes downwardly away from the conduit or duct 9 and is substantially normal thereto and provides a guide surface 18 on its outer side which faces toward the duct 9 and adapted to guide the deflated tube as shown at 13a in Figure 4 by engagement with the outer edge 19 of the flexible tube 13. It will also be seen from a consideration of Figure 4 that the disposition of the panel 17 obtains a positioning of the opening 16 so that it faces partially downwardly and thus as the tube 13 begins to extend receives at its lower edge 16a the upper portion 13b of the tube, and it will be readily appreciated that with continued blasting of the air in the direction shown by the arrows in Figure 2, the tube 13 will extend to its full length and will enter the basket as shown in Figure 2. It will also be understood that the transverse dimension, in the present instance the diameter of the tube 13, is slightly in excess of the diameter of the opening 16 so that the outer periphery of the tube will seal against the periphery or the margin of the opening 13 and thus prevent any blow-back of material such as cotton from the interior of the basket between the opening 16 and the tube 13.

It will be noted that in the present instance the guide means are constituted by the surface 18 and the positioning of the opening 16, however, it will be understood that various other forms of guides such as U-shaped extensions on the basket and the like may be provided.

As best seen in Figure 1 it will also be noted that the disposition of the duct 9 and the basket 5 is such that it is close to the operator's seat 25 so that if he should so desire he may merely put the tube 13 manually into the opening 16 and then initiate the blowing action in order to expand the tube.

It will be understood that the term "side" does not necessarily mean a vertical side but may mean the bottom or the top of the basket.

It will be further understood that the specific embodiment herein disclosed, which has been actually tested, is not intended to limit the invention inasmuch as other forms of the invention will be readily apparent to those skilled in the art within the spirit and the scope of the appended claims.

What is claimed is:

1. In a pneumatic conveyor of the type incorporating a blower with a material discharge duct and a material receptacle disposed in receiving relation to said duct, the combination of a wall defining a side of said receptacle and provided with an inlet opening therethrough and a tube connected to said duct in extension thereof and projecting through said opening into said receptacle, said tube being formed of flexible inflatable material and dimensioned slightly larger than the opening and adapted to inflate against the periphery of said opening in sealing relationship thereto attendant to operation of said blower.

2. In a pneumatic conveying device of the type incorporating a blower and material conveying pipe and a material receiving receptacle wherein the blower operates to convey material through the pipe into said receptacle, the combination with a side of said receptacle having an inlet opening, an inflatable, flexible tube connected to said pipe and extending through said opening into said receptacle, said tube having transverse dimensions in excess of those of said opening and inflatable pursuant to operation of the blower and the passage of air therethrough to expand tightly against the margin of said opening to provide a seal therebetween.

3. The invention according to claim 2 and further characterized in that said tube is made of canvas.

4. In a pneumatic conveying system for a cotton picker of the type embodying a support and a receptacle pivoted thereon and swingable to a receiving position or to a dumping position, a stationary conveying duct positioned to direct material into said receptacle in the receiving position thereof and including a rigid pipe section and a flexible, transversely collapsible tube section connected to said rigid pipe section and extending outwardly therefrom, said receptacle having a side portion with an inlet opening therethrough, said flexible tube adapted to be inserted in its transversely collapsed condition into said opening and said tube section expansible transversely and extensible lengthwise to tightly engage the periphery of said opening and project into said receptacle upon the introduction of an air blast in said duct, and said tube collapsible when said air blast is cut off whereupon said receptacle is swingable to dumping position with coincidental withdrawal of said tube from said opening.

5. The invention according to claim 4 and said rigid pipe section and said opening disposed in alignment longitudinally of said pipe section and said tube in the deflated condition thereof hanging downwardly from said pipe section and disposed between the adjacent end of said pipe section and said opening and said side of said receptacle in said receiving position thereof sloping in a direction downwardly and away from said tube and providing a guide surface for said tube to guide its entry into said opening as the tube is being inflated upon the introduction of an air blast in said duct.

6. In a pneumatic conveying device of the type embodying a blower and a material conveying duct through which said blower directs a continuing blast of material entraining air, the combination of a receptacle, a support therefor, means movably mounting the receptacle upon the support for disposing said receptacle in dumping or receiving positions, said receptacle having a side with an inlet opening therein, said duct having a rigid pipe section in longitudinal alignment with said inlet opening in the receiving position of said receptacle, a flexible deformable tube section connected to said rigid pipe section and having a length greater than the space between said side of said receptacle and the adjacent end of said rigid pipe section, said tube adapted to extend from said pipe section into said receptacle through said opening and being displaceable transversely of the line of alignment between said pipe section and said opening for withdrawal from the opening to accommodate moving said receptacle from receiving to dumping position, and means for guiding said tube into said opening attendant to said tube aligning with said rigid pipe section and said opening upon the introduction of an air blast in said duct.

7. The invention according to claim 6 and further characterized in that said tube is dimensioned transversely larger than said opening to expand tightly against the periphery of the opening to seal against the same and thereby prevent blow-back of material from said receptacle.

8. The invention according to claim 6 and further characterized in that said means for guiding said tube into said opening comprises said pipe section positioned diagonally upwardly toward its discharge end and said side of the receptacle in said receiving position is disposed substantially normal to said pipe section and said flexible tube in said displaced position thereof hangs downwardly from said pipe section, and said opening faces partially downwardly whereby as said tube is being inflated its outer end moves upwardly along said surface and into said opening and subsequently enters said opening.

References Cited in the file of this patent

UNITED STATES PATENTS

| | | |
|---|---|---|
| 1,353,291 | Stroud | Sept. 21, 1920 |
| 1,422,105 | Kirby | July 11, 1922 |
| 2,554,894 | Campbell | May 29, 1951 |